US011461088B2

(12) United States Patent
Martick

(10) Patent No.: US 11,461,088 B2
(45) Date of Patent: *Oct. 4, 2022

(54) SOFTWARE TRANSPORT CHECK INTEGRATION IN UPGRADE CONTEXT

(71) Applicant: SAP SE, Walldorf (DE)

(72) Inventor: Christian Martick, Berlin (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/179,272

(22) Filed: Feb. 18, 2021

(65) Prior Publication Data

US 2021/0173631 A1 Jun. 10, 2021

Related U.S. Application Data

(63) Continuation of application No. 16/356,702, filed on Mar. 18, 2019, now Pat. No. 10,963,240.

(51) Int. Cl.
| | | |
|---|---|---|
| *G06F 11/36* | (2006.01) | |
| *G06F 8/65* | (2018.01) | |
| *G06F 8/10* | (2018.01) | |

(52) U.S. Cl.
CPC ............... *G06F 8/65* (2013.01); *G06F 8/10* (2013.01); *G06F 11/3612* (2013.01)

(58) Field of Classification Search
CPC ..... G06F 8/60; G06F 8/61; G06F 8/65; G06F 11/3604
See application file for complete search history.

(56) References Cited

U.S. PATENT DOCUMENTS

| 11,106,442 B1 * | 8/2021 | Hsiao ................... G06F 8/61 |
| 2009/0235232 A1 * | 9/2009 | Malik .................. G06Q 10/06 717/120 |

(Continued)

OTHER PUBLICATIONS

Anonymous "Updating SP ABAP Systems on UNIX and LINUX: SAP HANA DB", 2019, 222 pages.

*Primary Examiner* — Duy Khuong T Nguyen
(74) *Attorney, Agent, or Firm* — Fountainhead Law Group P.C.

(57) ABSTRACT

Embodiments offer early assessment of upgrade compliance checking upon software landscape production data, prior to actually executing a full impact analysis. In a pre-transport phase, discrete upgrade compliance checks are run and corresponding reports returned to individual developers. In a transport phase, batches of combined compliance checks (bundled into released transports) are run and corresponding reports returned to higher level users. According to certain embodiments, pre-transport and/or transport compliance checking is performed upon landscape production data condensed to a bi-value states. Such condensing can desirably reduce stored data volumes and impart security. According to some embodiments, pre-transport and/or transport compliance checking is performed upon production data merged across multiple landscapes. This avoids storing redundant upgrade check data. Early indication of compliance checking violations, can reduce the incidence of last-minute compliance problems arising during subsequent full impact analysis (which is fraught with potential consequences for system down-time).

20 Claims, 18 Drawing Sheets

(56) References Cited

U.S. PATENT DOCUMENTS

| | | | |
|---|---|---|---|
| 2014/0200699 A1* | 7/2014 | Vincelli | G06F 30/30 |
| | | | 707/812 |
| 2015/0058822 A1 | 2/2015 | Elias et al. | |
| 2015/0186125 A1 | 7/2015 | Avery et al. | |
| 2017/0116135 A1 | 4/2017 | Sundaravaradan et al. | |

* cited by examiner

```
TYPES: BEGIN OF ty_tabdata,
    tabname              TYPE tabname,
    tabclass             TYPE tabtypes,
    sqltab               TYPE sqlappdtab,
    contflag             TYPE contflag,
    devclass             TYPE devclass,
    changes_per_sec      TYPE p LENGTH 16 DECIMALS 10,
    total_size_in_mb     TYPE int4,
    nametab_header       TYPE x030L,
    nametab_fields       TYPE dd_x0311_table,
    export_timestamp     TYPE timestamp,
END OF tys_tabdata.
```

FIG. 10

SOFTWARE TRANSPORT CHECK INTEGRATION IN UPGRADE CONTEXT

BACKGROUND

Unless otherwise indicated herein, the approaches described in this section are not prior art to the claims in this application and are not admitted to be prior art by inclusion in this section.

Multi-faceted software landscapes are increasingly relied upon for the storage, manipulation, and analysis of large data volumes. In one possible scenario, a software landscape may comprise distinct yet related software systems that are dedicated to processing logistical data and resource availability, respectively, for a given enterprise.

The upgrading (e.g., via a transport process) of an individual software component that is resident within such a complex software landscape, can be difficult. This is due to many subtle interconnections that may exist between the upgraded program and others in the landscape, with upgrade changes potentially having wide-ranging ramifications that are not readily apparent even to seasoned developers.

SUMMARY

Embodiments offer early assessment of upgrade compliance checking upon software landscape production data, prior to actually executing a full impact analysis. In a pre-transport phase, discrete upgrade compliance checks are run, and corresponding reports returned to individual developers. In a transport phase, batches of combined compliance checks (bundled into released transports) are run, and corresponding reports returned to higher level users. According to certain embodiments, the pre-transport and/or transport compliance checking is performed upon landscape production data condensed to a bi-value states. Such condensing can desirably reduce stored data volumes and impart security. According to some embodiments, the pre-transport and/or transport compliance checking is performed upon production data merged across multiple landscapes. This avoids storing redundant upgrade check data. Early indication of violation(s) of compliance checking, can reduce the incidence of last-minute compliance problems arising during subsequent full impact analysis (that is fraught with potential consequences for system down-time).

An embodiment of a computer-implemented method comprises receiving data from a production environment of a first software landscape, executing a first upgrade compliance check upon the data, and generating a pre-transport report including a first result of the first upgrade compliance check. A released transport is received comprising the first upgrade compliance check and a second upgrade compliance check. The released transport is executed upon the data, and a transport report is generated including a second result of the released transport.

A non-transitory computer readable storage medium embodies a computer program for performing a method comprising, receiving data from a production environment of a first software landscape, the data condensed to a bi-value form, executing a first upgrade compliance check upon the data, and generating a pre-transport report including a first result of the first upgrade compliance check. A released transport is received comprising the first upgrade compliance check and a second upgrade compliance check. The released transport is executed upon the data. A transport report is generated including a second result of the released transport.

An embodiment of a computer system comprises one or more processors and a software program executable on said computer system. The software program is configured to cause an in-memory database engine to receive data from a production environment of a first software landscape, to execute a first upgrade compliance check upon the data, and to generate a pre-transport report including a first result of the first upgrade compliance check. The in-memory database engine receives a released transport comprising the first upgrade compliance check and a second upgrade compliance check. The in-memory database engine executes the released transport upon the data, and generates a transport report including a second result of the released transport.

According to some embodiments the data is condensed to bi-value form.

In certain embodiments the data is stored locally in an application layer.

According to particular embodiments the data is merged across the production environment of the first software landscape, and a production environment of a second software landscape.

In various embodiments the second upgrade compliance check comprises an illegal object check.

Certain embodiments further comprise performing an impact analysis including the released transport, upon a buffer comprising the data in an uncondensed format, and generating an impact analysis report.

In particular embodiments the data is stored in an in-memory database, and the first upgrade compliance check is executed upon the data by an in-memory database engine of the in-memory database.

In some embodiments the buffer is stored in the in-memory database, and the first upgrade compliance check is executed upon the data by the in-memory database engine of the in-memory database.

The following detailed description and accompanying drawings provide a better understanding of the nature and advantages of various embodiments.

BRIEF DESCRIPTION OF THE DRAWINGS

FIG. 10 shows storage of data within a data structure.

DETAILED DESCRIPTION

Described herein are methods and apparatuses implementing software compliance checking in an upgrade transport process. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
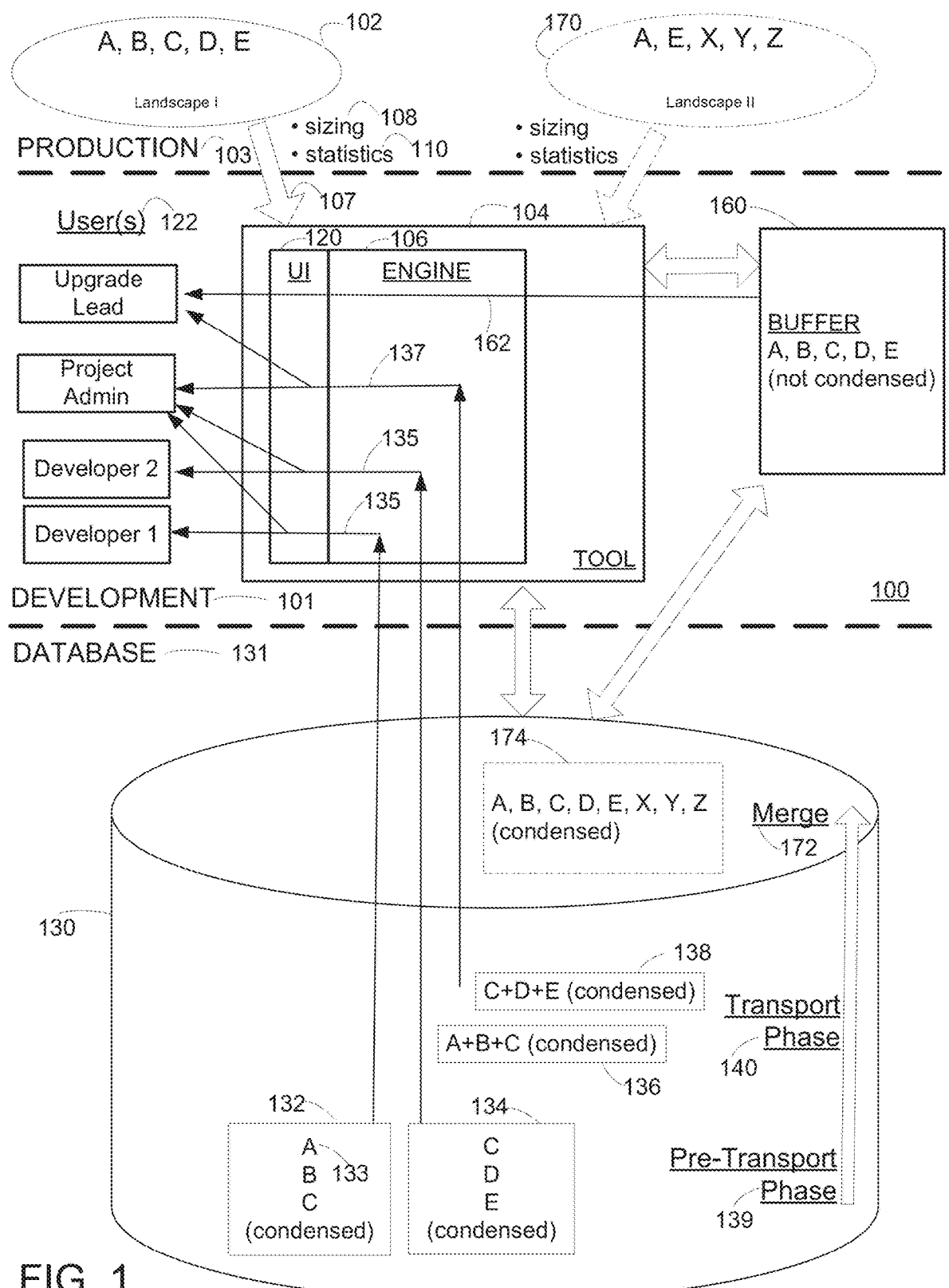
FIG. 1 shows a simplified diagram of a system according to an embodiment.

FIG. 1 shows a simplified view of an example system that is configured to implement upgrade transport compliance checking according to an embodiment. Specifically, system 100 comprises software landscape 102 present in a production environment 103, that is in electronic communication with an upgrade tool 104.

In particular, the upgrade tool is present within a development environment 101. The tool comprises a processing engine 106 that is configured to receive production data from the software landscape. As discussed in detail below in connection with the example of FIG. 11, one component of such production data may be size information 108. As discussed in detail below in connection with the example of FIG. 12, another component of such production data may be statistical information 110.

The engine is configured to process this production data collected from the software landscape, in order to perform checks regarding compliance with upgrade processes. Possible examples of such upgrade checking can include but are not limited to:
 identifying illegal objects (e.g., special data objects tailor-made by a customer for a specific landscape); and
 determining compliance with internal requirements, e.g., as reflected by execution of the ABAP Test Cockpit (ATC) available from SAP SE.

The tool further comprises a user interface 120 that is in communication with one or more users 122. One type of user is a developer.

The developer makes customer specific changes and wants to check as early as possible if changes might have impacts resulting in possible unwanted downtime. Opportunities for early detection of upgrade compliance issues include before and during release of a transport reflecting identified changes resulting in possible upgrade compliance issues.

Therefore, the developer seeks to be able to:
 trigger tests based on open and released transports,
 view the results,
 execute required changes; and
 check again for any upgrade compliance issues before a full compliance check is performed.

Another possible user type is an administrator. A development admin may be responsible for setting up the check framework, the actual check integration into transport release, sets up roles for exception approval, and may perform other tasks. A production admin may be able to configure the communication infrastructure for the data transfer. This might include Remote Function Call (RFC) infrastructure, system communication setup, and other tasks.

Still another user type is the project lead. As the creation of a buffer of transports might call for project-related knowledge, the project lead may generate the buffer file (subset of all transports in production queue) using transaction (e.g., SUPGINT_APP) in any system connected to the production system via a Transport Management System (TMS).

The selection of transports will then be used as basis for running included checks. If conflicts are found, the admin might need help to resolve them, or to flag them as false positive. The checks may include both: forbidden objects, and compliance checks.

Another user type is the upgrade lead, who checks the buffer created from a technical perspective, and validates that it was checked. In addition, the upgrade lead will perform the Software Upgrade Management (SUM) functions and include the buffer file created by the project admin into the upgrade. Also, the full impact analysis may be triggered by the upgrade lead.

FIG. 1 further shows the compliance tool 104 as being on communication with database 130 an underlying database layer 131, in order to store the landscape production data and the corresponding compliance check outcomes. For example, during a pre-transport compliance checking phase 139, the highly simplified view of FIG. 1 shows that Developer 1 may be responsible for performing upgrade compliance checking limited to individual check(s) 133, e.g., A, B, and C of the software landscape.

Thus, the database layer stores pre-transport check data 132, specific to those compliance checks A, B, and C. As shown in FIG. 1 and described in detail later below, those compliance checks may be stored in the form of bi-value data, condensed from the actual sizing/statistical production data. This condensing may be performed for security reasons, in order to prevent the individual developer from having access to actual production data from the landscape.

FIG. 1 further shows individual Developer 2 responsible for performing upgrade compliance checking limited to C, D, and E of the software landscape. Again, this limited compliance checking data 134 is stored in the database layer, possibly condensed to bi-value format for security purposes.

Compliance issues arising from processing the initial compliance checks by the engine, are the subject of reports 135. These are sent back by the engine via the UI, for the attention of and handling by the individual developer(s), as well as possibly to administrators.

Once developer(s) have conducted discrete checks of this pre-transport compliance phase, received the reports, and satisfied themselves of the resolution of potential upgrade issues, the next (transport) phase is entered. Here, the developers bundle related compliance checks into entities known as transports 136, 138, and to release those transports for further compliance checking.

Thus in the highly simplified example of FIG. 1, at the conclusion of pre-transport checking, Developer 1 may be satisfied that each of checks A, B, and C individually do not indicate any upgrade compliance violation. As part of a transport phase 140, however, Developer 1 then bundles the related checks A, B, and C together into a transport, in order to determine if the combination (A+B+C) is somehow in compliance violation where the individual checks (A, B, C) are not.

Again, the engine of the tool performs the compliance checks of the transport, and generates a respective report 137 for viewing. The UI may provide this transport report for review by a user such as the administrator (and also possibly the upgrade lead).

Once user(s) are satisfied that the transport report(s) indicate that the compliance checks appear to be satisfied and that no further problems are known, the next phase may be to conduct a full impact analysis. In particular, as part of this process the tool references a buffer 160, that stores data (e.g., sizing, statistical) from the production environment of the landscape. Such production data is stored in the buffer in uncondensed form.

The engine processes the buffer data with compliance checks, to produce an impact analysis 162 report reflecting a full analysis of any possible remaining issues. That impact report is typically provided to a limited number of users (e.g., the upgrade lead) possessing security clearance that permits their relatively unrestricted access to production environment data.

As this full impact analysis step is resource consuming, such remaining issues will hopefully be few in number given the previous vetting allowed by the pre-transport and transport compliance checking according to embodiments.

Returning to the pre-transport and transport compliance checking utilizing condensed data, it is noted that different computer software landscapes may have certain checks in common. For example, a second landscape 170 may feature checks X, Y, and Z, as well as checks A and E that are also common to the first landscape 102.

Accordingly, certain embodiments may further comprise a merger phase 172, in which compliance check results across production environments of a plurality of landscapes are stored in a shared data structure 174. This merger step may serve to reduce storage requirements, offering condensed production data that eliminate redundant storage of common compliance checks. That is, in FIG. 1 the redundancy of checks A and E between the two landscapes, may be recognized, and result in having to store reduced compliance check data volumes.

Figure 2:
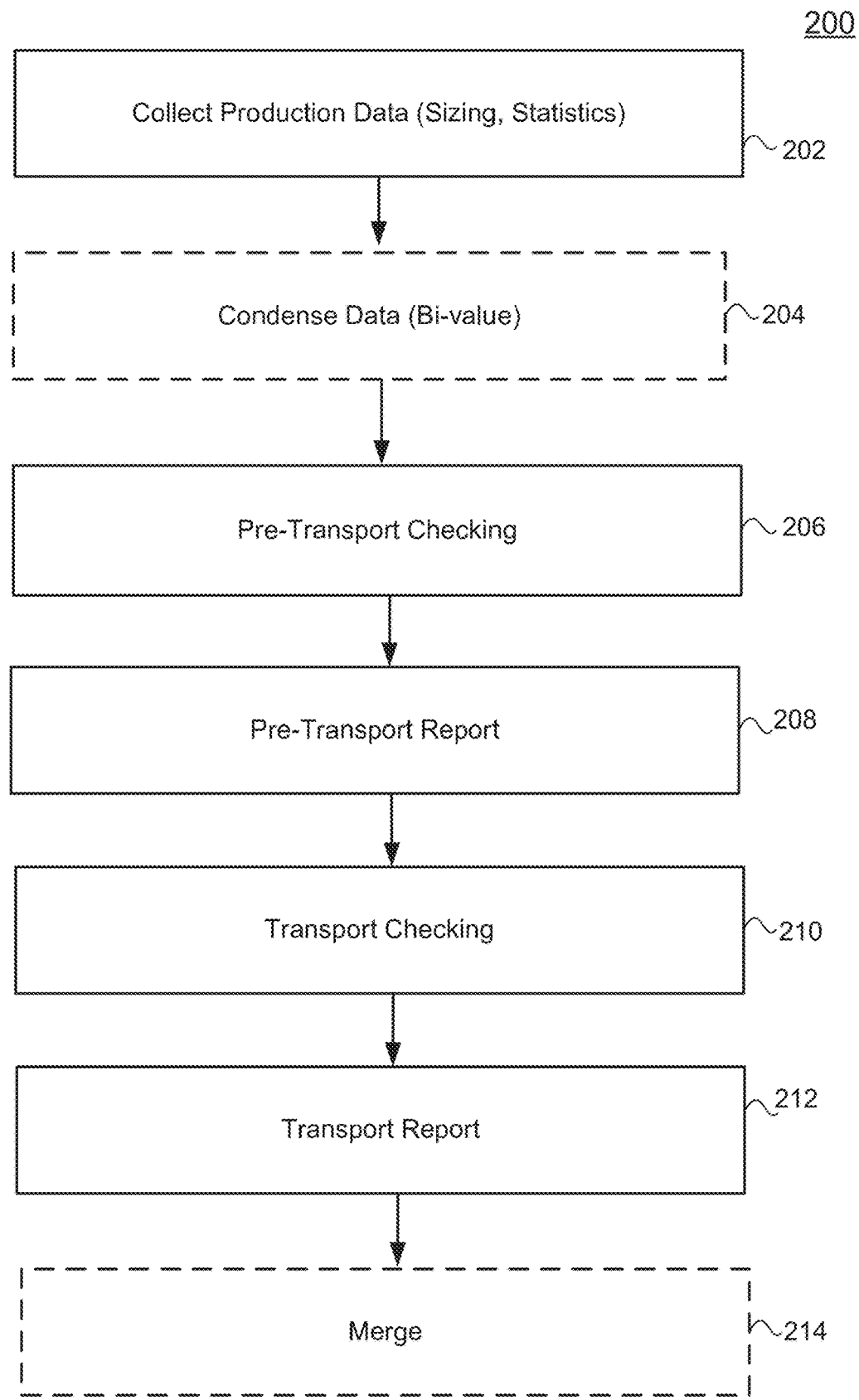
FIG. 2 shows a simplified flow diagram of a method according to an embodiment.

FIG. 2 is a flow diagram showing various actions taken in a method 200 according to an embodiment. At 202 data in uncondensed form is collected from the production environment of a computer software landscape. In certain embodiments that data may comprise sizing and statistical components.

At 204, the landscape engine production data is condensed. This condensing reduces the data to bi-value states. For example, rather than offering a specific value for a particular data processing speed, the condensed bi-value may simply indicate whether that particular data processing speed exceeds (or not) a predetermined threshold.

Such condensing can offer multiple benefits. One benefit is in the reduction of the volume to be stored. The bi-values consume less storage capacity than the full data values.

Another benefit is enhanced security. That is, the bi-values do not offer direct access to actual performance characteristics of the computer software landscape, which may be confidential and not desired to be available to a lower-level user (such as a developer).

At 206, FIG. 1 shows the performance of pre-transport checking on the available condensed data. As described above, such checking may be performed iteratively, on a check-by-check basis (e.g., A, B, C) until and individual developer is satisfied of passage by those checks. A pre-transport report is issued at 208 to a user.

At 210, FIG. 1 shows the performance of transport checking on the available condensed data. As described above, such checking may be performed iteratively, on groups of individual checks, (e.g., A+B; A+C; B+C; A+B+C) until a developer and/or higher level user are satisfied of passage by those transports. A transport report is issued to user(s) at 212.

At 212, FIG. 1 shows the optional merger step. Here, compliance check results from production environments of other software landscapes, may be merged with those of the current landscape. This merger step serves to reduce storage requirements, where upgrade compliance checks offer redundancy between the different software landscapes. That is, in FIG. 1 the redundancy of checks A and E between the two landscapes, may be recognized and result in having to store smaller compliance check data volumes.

It is noted that the stages shown in FIG. 2 are not necessarily shown in their exact order, and variations are possible. For example, according to some embodiments the merger step may take place after the condensing, such that the pre-transport and transport checking is performed on the merged data set.

Further details regarding checking software upgrade transport for compliance checking, are now provided in connection with particular examples involving specific elements available from SAP SE, of Walldorf, Germany.

EXAMPLE

The following example is taken from the productive implementation of various embodiments in the context of the ABAP framework that is available from SAP SE of Walldorf, Germany. For this particular example, the solution may be delivered as part of existing on-premise channels such as SAP Basis and Upgrade Tooling.

As an initial matter, it is noted that customers often use a central development system in order to create software and customizing for multiple production systems. Hence, embodiments should to support such 1-to-n landscape set-ups.

The basis for the actual check is both •statistical and •sizing data from a given production system. This quality is not trivially satisfiable, as each production system (depending on the actual business processes running) has different statistical and sizing data.

In certain embodiments, the checks can be performed as part of development (on a single request basis). According to particular embodiments, the checks can be performed as part of the queue preparation process (a set of transports). In both cases, the runtime of a check should be short enough to be performed within a reasonable time frame.

The specific architecture presented by this particular example, integrates various building blocks in order to provide an end-to-end check integration that allows customers to judge the impact of custom developments in a zero-downtime optimized (ZDO) upgrade context as early as possible.

Figure 3:
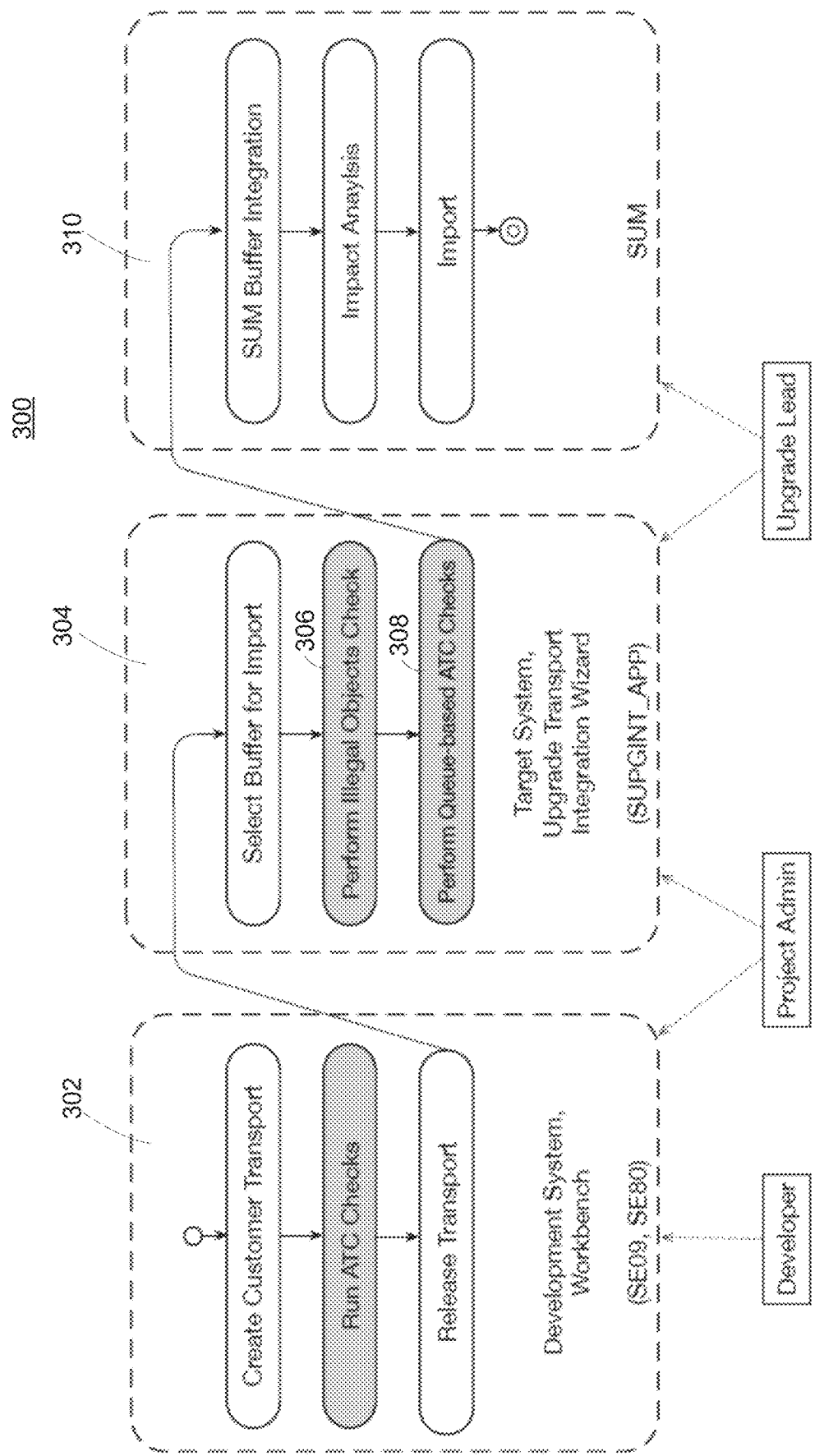
FIG. 3 shows a simplified flow diagram of the overall check integration according to an example.

A high level check flow and its main components are now described. Specifically, FIG. 3 is a simplified flow diagram 300 depicting an overall check flow.

As shown at 302, early during development the compliance checks can be triggered in the context of ABAP Test Cockpit (ATC) executions. The developer thus receives early feedback regarding if/how changes are impacting a ZDO upgrade.

As no transport has been released yet, adjusting to the results is fairly straightforward. The check itself can also be configured to be part of the release process.

Once released, the transport will be tested in quality assurance context/system as shown in phase 304. If such a transport should be then included into an upgrade, it will be part of the selection process in the "Upgrade Transport Integration Wizard".

Here, both core checks 306 and 308 can be triggered again on the complete set of transports that are planned for integration. Depending upon the check result, a transport can be still removed from this subset if it will cause problems in ZDO upgrade contexts. As this process phase is normally executed prior to running the full Software Update Manager (SUM) 310 in the final phase, it offers both the upgrade leader and the project administrator valuable lead time to gather feedback, to plan, and to react accordingly.

Once the SUM is initiated, a complete impact analysis can be commenced. This effort can be resource consuming, and so performing the previous phases can desirably serve to enhance the efficiency of the last (SUM) phase.

As mentioned above, embodiments integrate the first two phases—development and buffer creation. For the actual check run, data from the production contexts is consumed. The retrieval and persistence of that size/statistical production information is described in more detail below.

Figure 4:
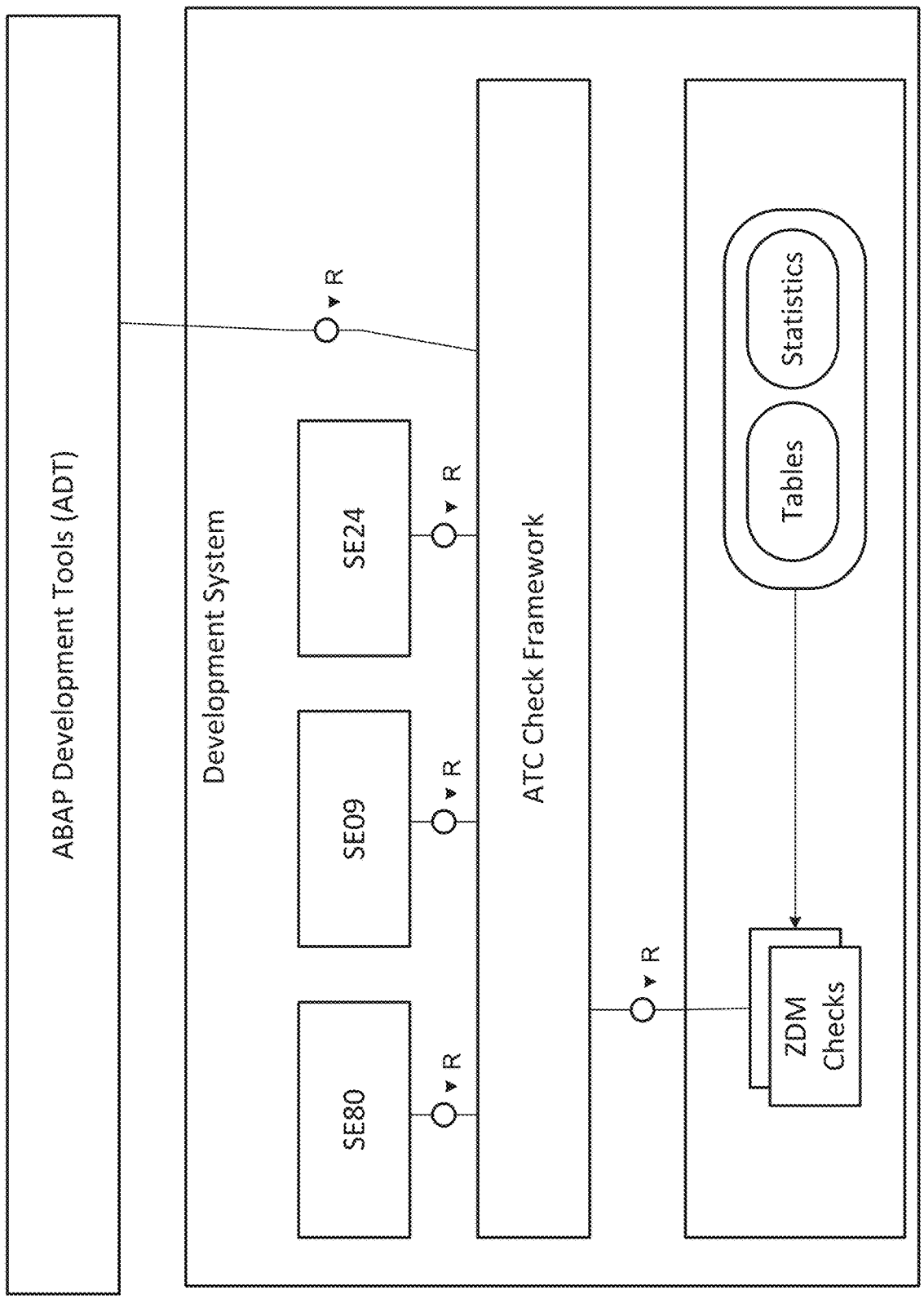
FIG. 4 is a simplified block diagram showing an enlarged view of the development context check integration in the example.

FIG. 4 shows a detailed view 400 of the development phase. During development, the developer is interacting via various workbenches. These workbenches allow the generic execution of ATC checks in a standardized manner. The ATC checks call for each of the following:
the list of objects changed by the developer, and
the statistical and sizing data retrieved from production.

Owing to its statistical nature, the latter data does not need to be retrieved live during check runs, but can be retrieved ahead of time and stored locally. The same applies when the check is included in the release process.

Figure 5:
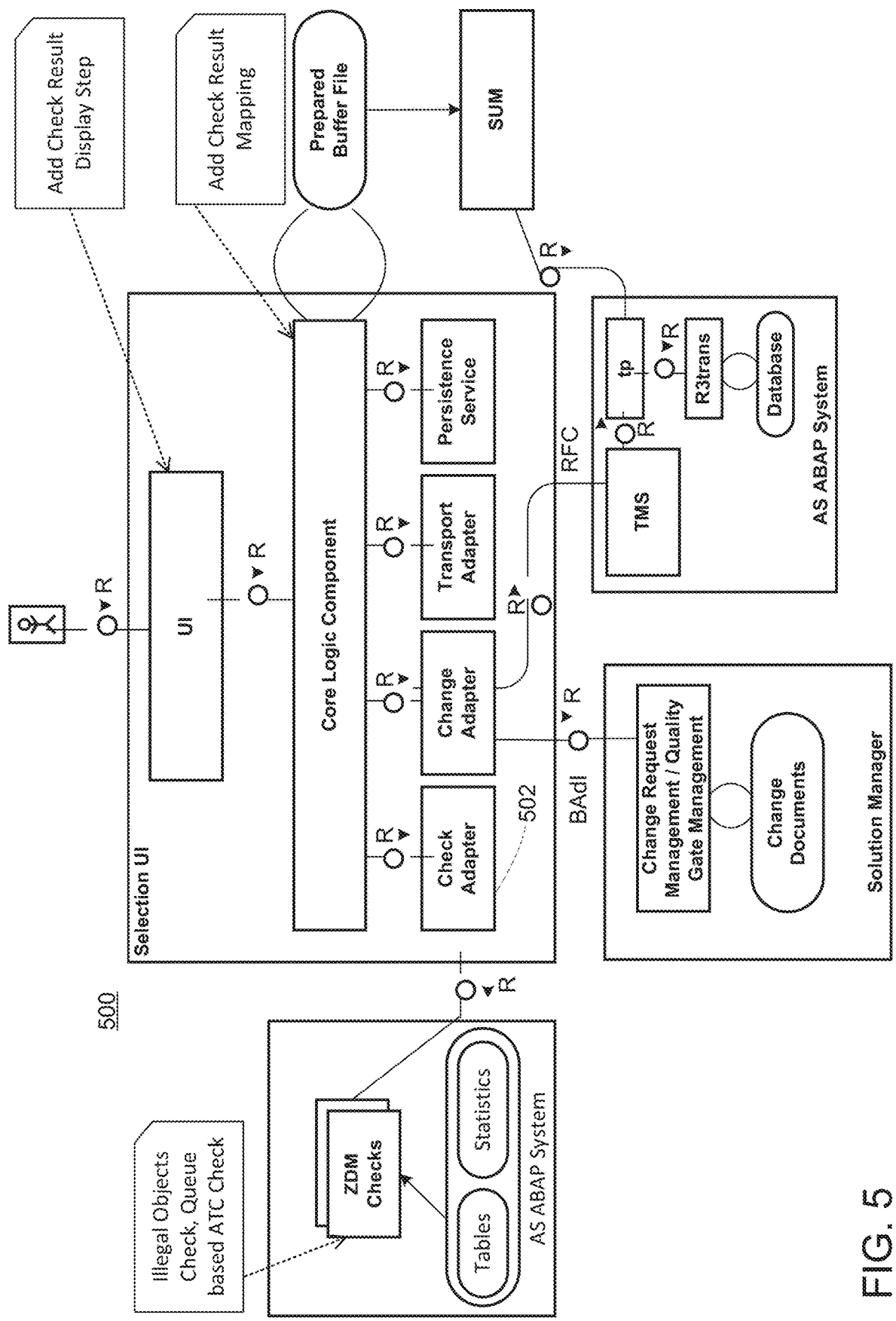
FIG. 5 shows is a simplified block diagram illustrating wizard context.

Once a buffer is be generated, the targeted set of requests will be selected in the Upgrade Transport Integration Wizard tool. FIG. 5 shows a simplified block diagram of the tool 500.

FIG. 5 shows that within this tool, an adapter 502 is introduced. That adapter serves to trigger the compliance checks, display results, and allow the user to make informed decisions on possible follow-up actions.

The wizard may be a UI integration point to bring together:
transport based buffer information, and
project/process metadata available from orchestration tools such as Change Request Management (ChaRM) available from SAP.

Figure 6:
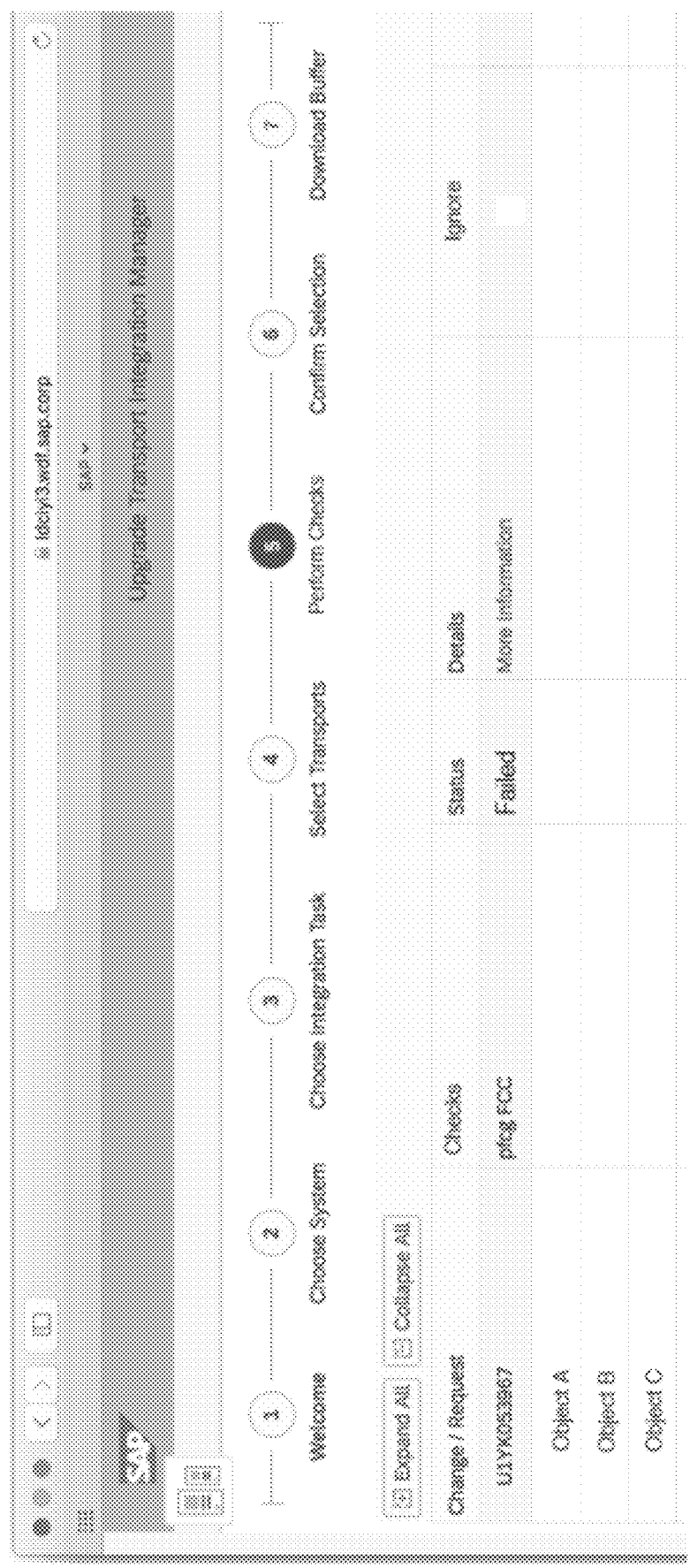
FIG. 6 is a simplified screenshot illustrating an additional wizard step.
Figure 7A:
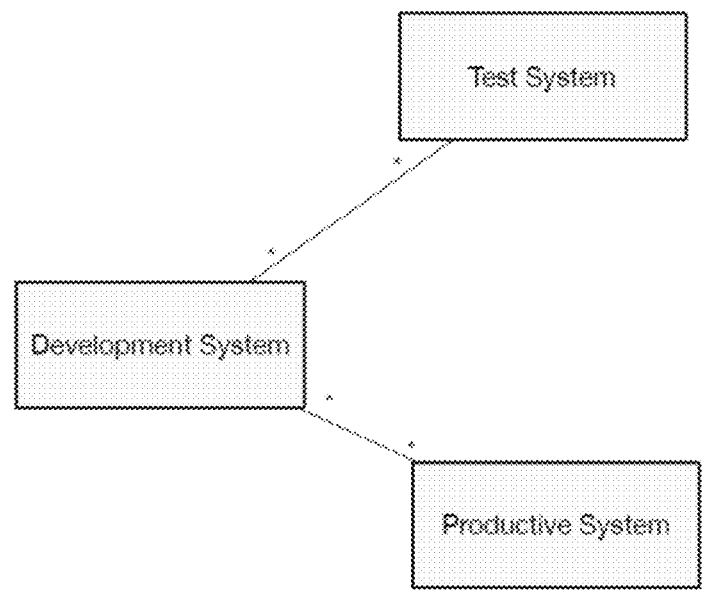
FIGS. 7A-B show default landscape views.
Figure 7B:
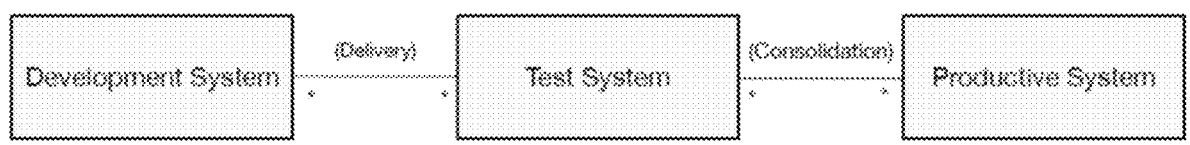

The wizard serves as a bridge to generate a buffer to be included in upgrades. Enhancement by inclusion of the additional check adapter may be accompanied by a UI extension that introduces an additional step within the wizard. FIG. 6 illustrates a simplified screen shot of an additional wizard step.

Some security issues may be implicated by upgrade transport compliance checking according to embodiments. For example, the statistical data is retrieved from production systems. Accordingly reading, propagating, and storing that statistical production data in a development system context, should be handled carefully.

And even where the statistical data does not directly relate to business data or processes, it could allow for fingerprinting and/or benchmarking different business processes. Such information could be utilized as part of a larger attack scenario, and raises a possible security vulnerability.

In one example, high read/write activity on certain tables might reveal specific processes being currently executed—e.g. an annual closure run, or monthly payroll runs. Hence, this data should be treated in a sufficient secure manner.

In order to address this issue, the data retrieval may reduce the informational depth accordingly. Details regarding this aspect are provided later below.

Further description of the system landscape for this example, is now provided. Overall, the software is designed to work in best-practice landscapes, where development systems support one or multiple productive systems by providing customer developments. Normally, such landscapes also include test and/or quality assurance systems to evaluate changes prior to productive deployment.

FIG. 6A shows a simplified view of one option of connecting development systems to test and production systems. In general, the systems are connected via standard transport mechanisms. FIG. 6B shows a simplified view where one development system can deliver changes to many test systems, which in turn deliver tested changes to multiple production systems.

As embodiments clearly implicate integration scenarios, the testing may utilize an actual end-to-end scenario test suite, in order to test as close to actual existing customer scenarios as possible. In addition, some of the various building blocks may form part of existing test plans already, with new developments done in a test driven fashion.

Further details are now regarding the transport check integration architecture according to the example, are now disclosed. First described is the required data, and a new mechanism to propagate it from production contexts to development systems.

For this data and communication aspect, the data required for the compliance checks is identified, and a retrieval mechanism to retrieve nametab, table sizing, and access statistics from a given set of production systems, is suggested. Specifically, in this specific example existing SAP technology may be re-used as follows.
SAP BASIS function modules read the data.
Transport Management System Communication Interface (TMS CI) moves the data from production systems to a development system.
ZDM ATC Check Repository stores the data for check runs.

Condensing, mapping, and configuration features are also called for. The actual compliance checks may call for at least the following three different types of descriptive data from a production environment:
1. Information on table sizes—table size and index sizes;
2. Information on table access statistics—updates, inserts, deletions per second;
3. Current table meta information ('nametab')—header data, fields, etc.

Sizing and access statistics may be recorded prior to the actual retrieval, during representative business usage. This may be accomplished by the customer using existing tools (e.g. transaction ST10).

Data that is generated, may be retrieved using the following existing functions:
1. 'DB_STATISTICS_DATA_READ' for table sizes;
2. 'SAPWL_TABSTAT_GET_STATISTIC' for table access statistics; and
3. 'DD_GET_NAMETAB' for nametab information.

Figure 8:
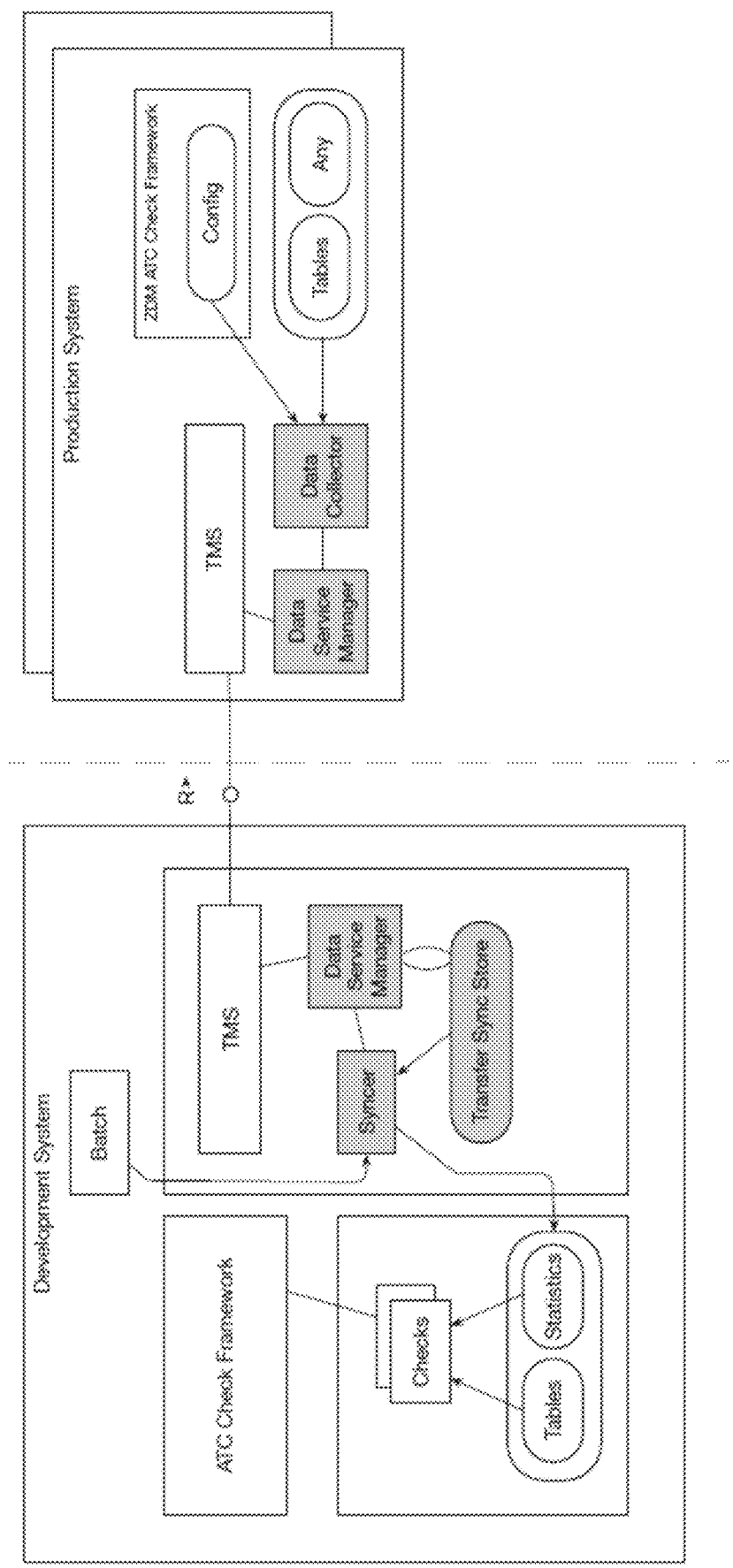
FIG. 8 shows communication building blocks of the example.

Those modules are invoked in the Data Collector represented in the simplified view of FIG. 8. That data collector is called as part of the remote data retrieval. Initiated on the development system by a simple batch setup, the Transport Management System (TMS) communication framework starts a service in the production system, which invokes the data retrieval module. In TMS landscapes, Remote Function Call (RFC) destinations with technical user with read authorizations exist from any system to any other system.

The data received will be saved locally. The Syncher module will feed the data right into the repository used for the actual compliance checks. The setup of the batch is described below.

As mentioned above, at least storing size and access data from a productive context, has security implications. Hence, it was decided to not store the complete data, but rather instead condense that data to the feasible required minimum.

In particular, it is noted that the checks themselves basically operate on threshold logic only (e.g. "is a table larger than", "is the table accessed more often than"). Actual and specific numbers are not really required to be transmitted or stored. Instead a dumbed down, bi-value piece of data describing the relation to the threshold (i.e., threshold criterium fulfilled or not fulfilled) is enough for these purposes.

Figure 9:
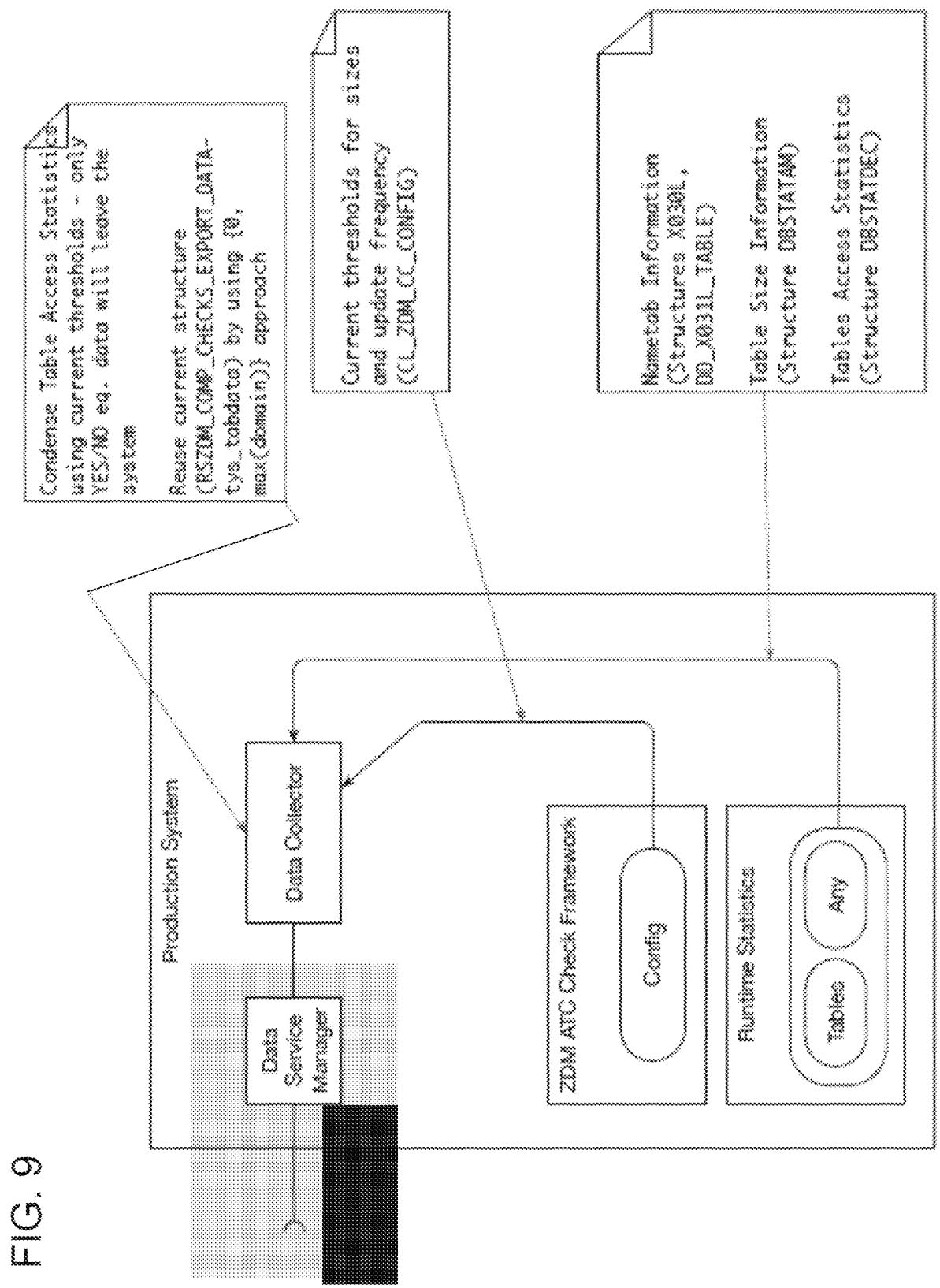
FIG. 9 is a simplified block diagram showing the condensing of data.

As the threshold defaults delivered by SAP can be adjusted by the customer, the data collector may also invoke this configuration store in order to construct the actual data. This is shown in FIG. 9.

Figure 11:
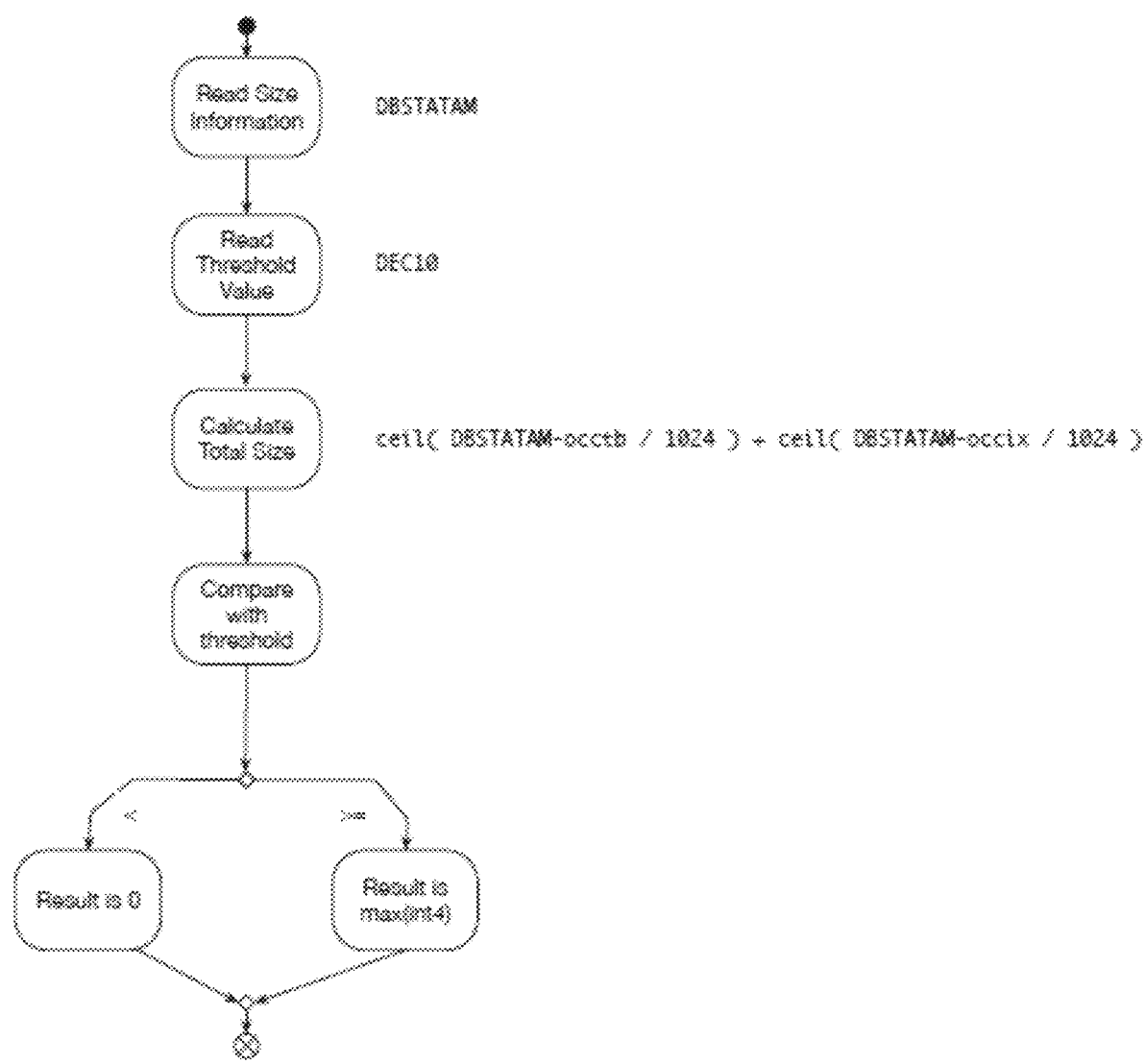
FIG. 11 is a flow diagram showing condensing size information according to the example.
Figure 12:
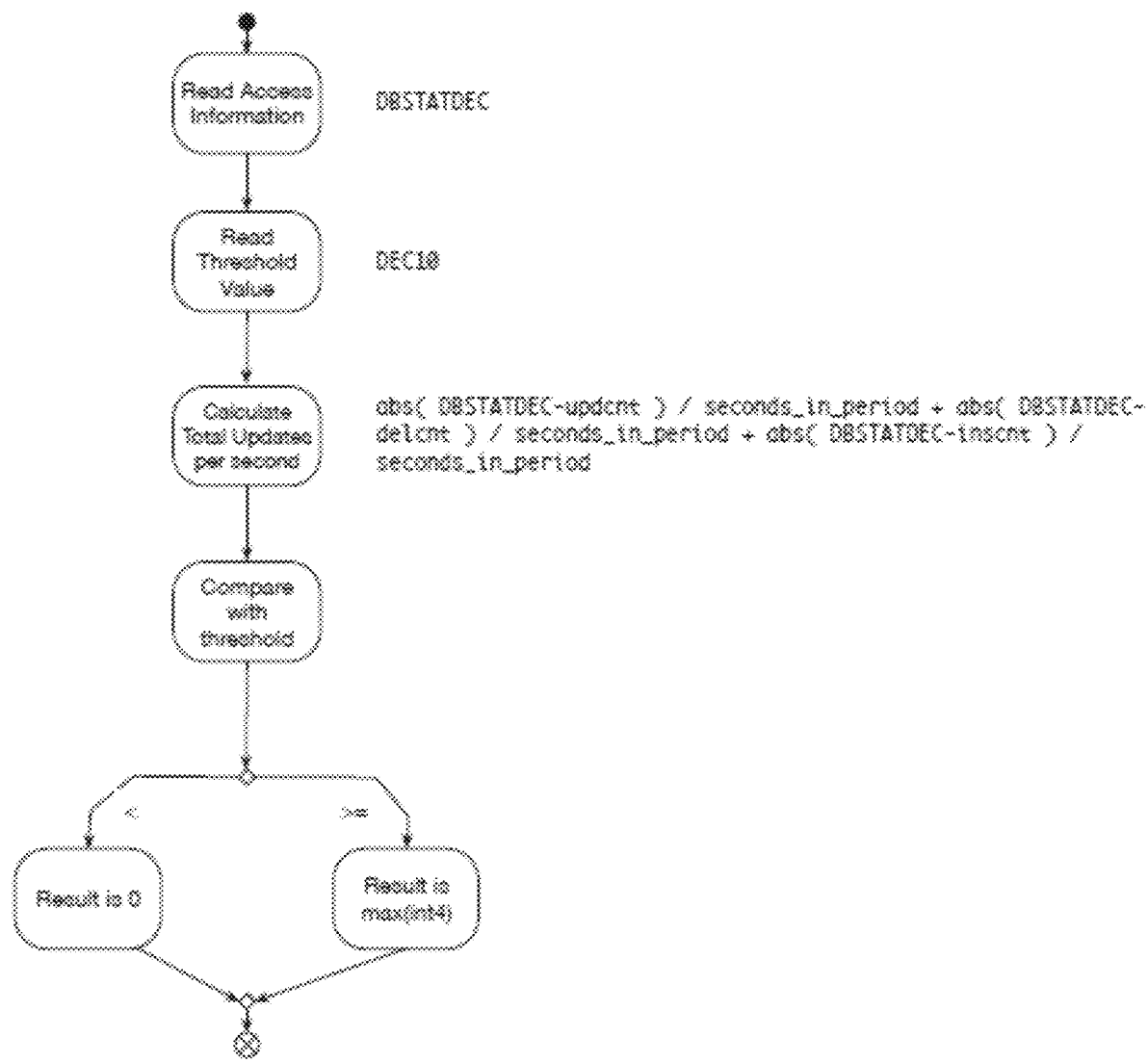
FIG. 12 is a flow diagram showing condensing statistical information according to the example.

Because the core infrastructure of the compliance checks is unaltered by this concept, the data may be stored within the data structure shown in FIG. 10. For that purpose, both size and access statics are condensed as shown in FIGS. 11 and 12. The results are stored in the total_size_in_mb and changes_per_sec fields, by mapping the threshold boolean result to $\{0, \max(\text{domain})\}$.

Whenever the configuration of the thresholds is adjusted, the condensed data might not be correct. Hence it is re-read and condensed again.

For the sake of recoverability, each data package received form the service may also be stored in an additional buffer table (Transfer Sync Store). With this layer, older data packages can also be retrieved locally and synched back to the actual check repository.

The sync store ensures that the transmissions can be handled independently, and are also locally replicable. The sync store is stored locally in a database table ('SCTS_UPGINT_ATC_BUFFER'), including:
GUID—to reference data pull
SYSTEM_NAME—data source system information
SYSTEM_DOMAIN—data source system information
DATE—date of pull
ZIPPED_DATA—zipped data blob
PARAMETERS—String container for additional information This sync buffer will be used a basis for a cross-system merge to encourage optimal performance. This is described below.

Configuration of the compliance check system according to this example is now described. Data retrieval is orchestrated from the development system, and can be configured via user interface.

In order to map relevant production systems to the development system, and configure the correct time windows and similar issues, such an interface is used. This transaction may include:
1. Selection of relevant production systems
   All systems known in landscape
2. Scheduling of Batch job
3. Selection of relevant time windows for statistics
4. Merge configuration setup
   On/off switch
   System selection for merge be merged
5. Extended check configuration (e.g. thresholds)
6. Navigation to ATC framework configuration As the stored data may be condensed with respect to the currently configured thresholds, changing the thresholds can always trigger the invalidation of the current data stored in the check repository. In addition, the data retrieval job is triggered for execution.

Workbench integration is now discussed. The checks themselves may be implemented, including integration with: "Checkman", "Code Inspector", and "ABAP Test Cockpit", they can be triggered from supported workbenches.

The checks can be configured to be executed automatically as part of the release of a transport request.

As the ATC framework provides wide options to give details and help for a specific finding, the check results can be consumed in an easy, standardized manner.

The aspect of exemptions within the ATC framework may be revised to accommodate particular embodiments. Useful toward creating an end-to-end solution, is provision of a gapless option for creating exemptions.

This is because sometimes the ATC framework produces false positives. Also, not all conflicts are always relevant for a given customer.

In the workbench context, the exemption process of the ATC framework can be reused to fulfil this specific requirement. However, those exemptions relate to specific ABAP key identifies and are granted based on those identifiers. By contrast, in the context of the compliance checks at hand, different findings might be mapped in a non-unique way (due to the inner workings of the checks).

Here, granting an exemption on this level will work for many cases. If required, however, a uniqueness requirement can be imposed.

The software upgrade checking according to embodiments, can be integrated with a user interface. As previously mentioned in connection with FIG. 5, the compliance checks may be executed not only during development and release phases, but also when a target buffer for upgrade integration is created by the customer.

Figure 13A:
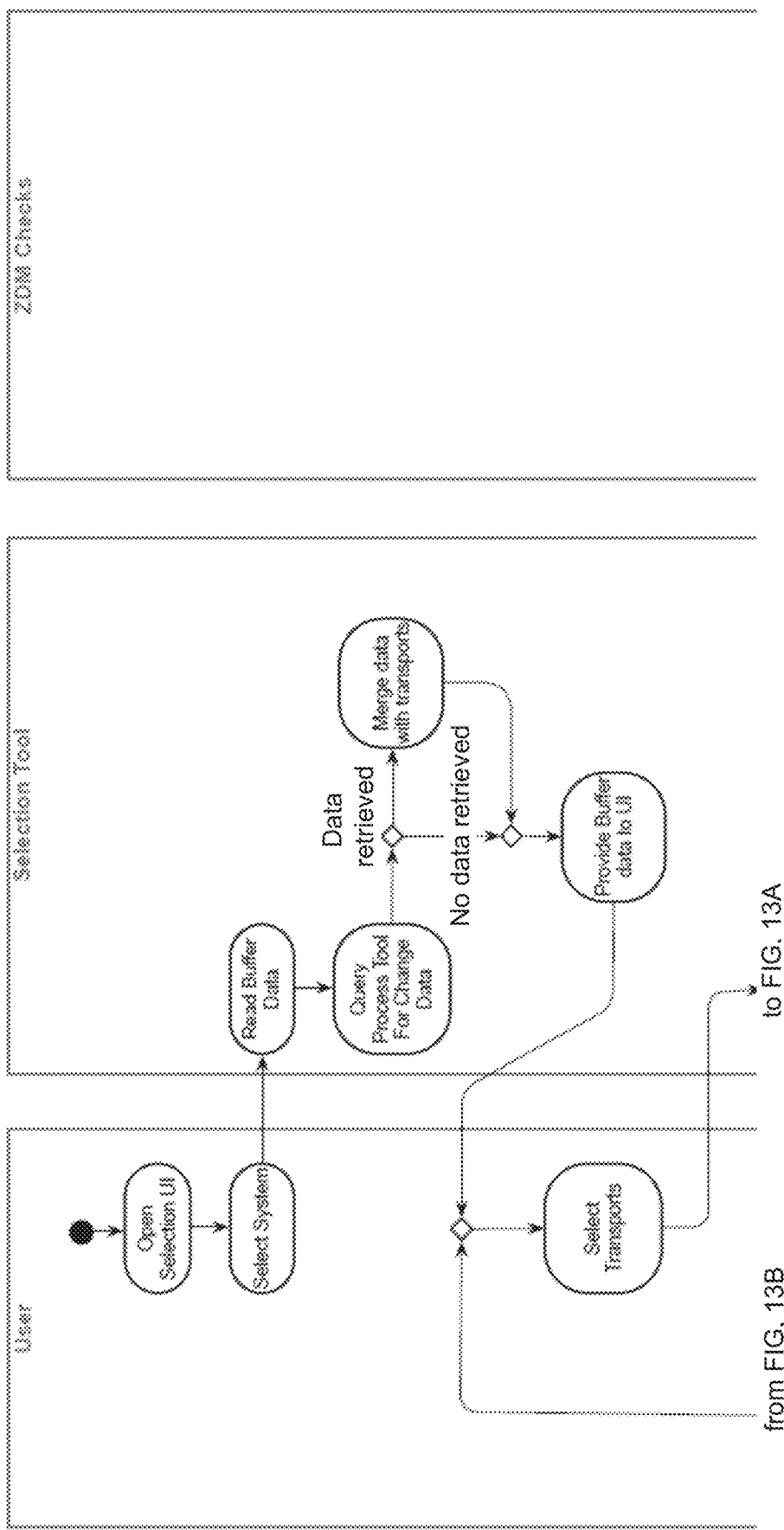
FIGS. 13A-B are simplified diagrams showing integration of a flow wizard.
Figure 13B:
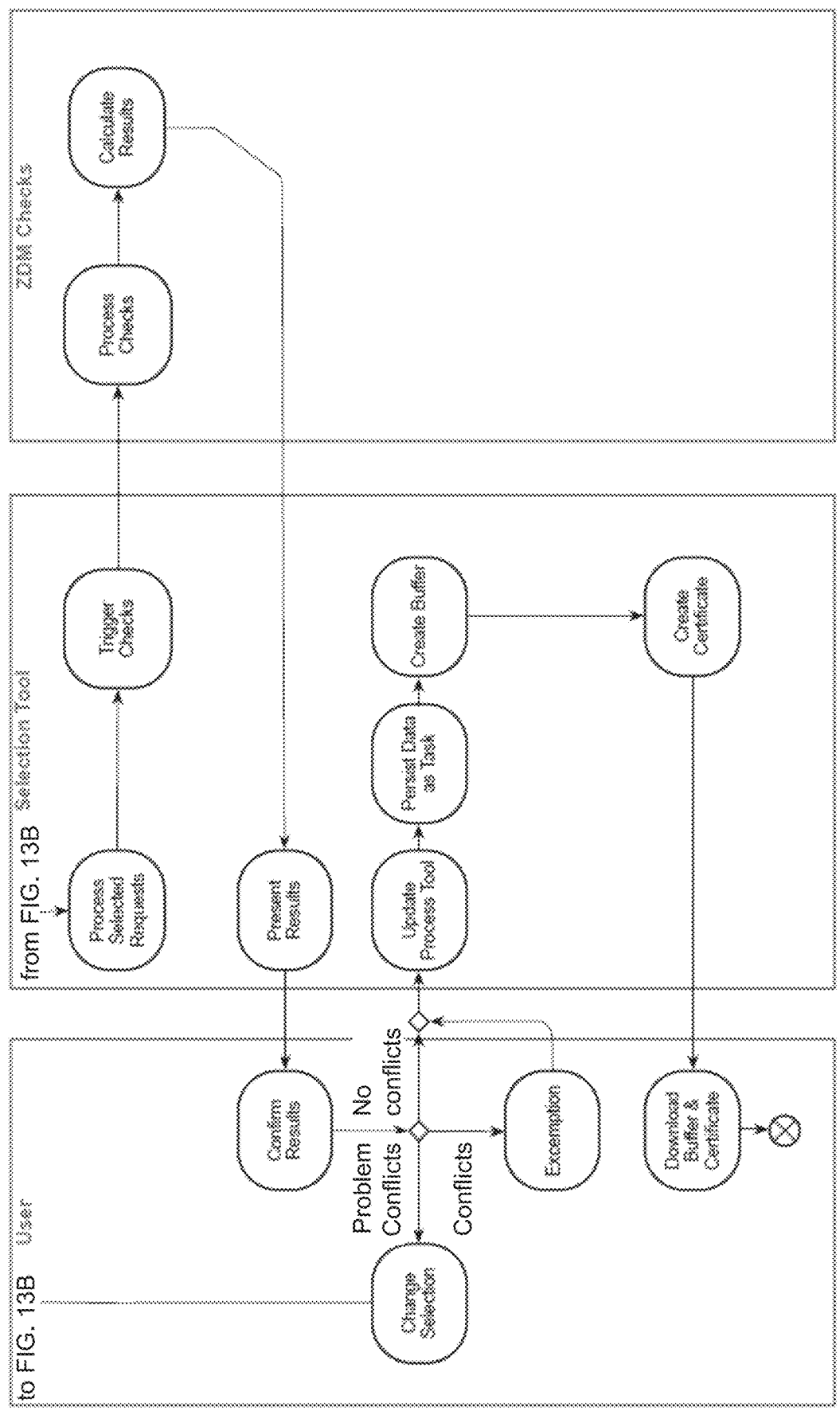

Thus an 'Upgrade Transport Integration Wizard' that is used for buffer creation, may be leveraged to execute those additional checks. As illustrated in FIGS. 13A-B, the checks may be invoked as an additional step within the wizard.

Within this additional step, the compliance checks are invoked and the results are presented to the end user. From a scope perspective, those checks will involve the same compliance checks, but in addition the 'illegal object check'. This 'illegal object check' resolves objects that are not supported in zero downtime contexts.

As sometimes critical check results can be disregarded, a simple exception process can be implemented. If no conflicts exist, the buffer will be generated. If conflicts exist, an exception will be granted or the transports in question are deselected. Granting an exception may be obtained via a specific user authorization.

The results of the checks, any exemptions and the actual buffer will be logged for compliance reasons. As the integration of the resulting buffer is only loosely connected to the SUM execution, the buffer generation can be documented using a buffer certificate as described later below in connection with FIG. 14.

From an implementation perspective, the adapter 502 of FIG. 5 will interact with any check framework via a BAdIbased interface. Decoupling the checks in this way facilitates enhancement of the wizard with other check content.

Roughly, the interface will comprise the following methods:
1. 'PERFORM_CHECK'—actual check invocation;
2. 'SET_ACCEPTED'—invoked when user chooses to ignore/accept a given check conflict (exemption);
3. 'GET_CHECK_NAME'—invoked to retrieve UI-relevant check name;
4. 'GET_CHECK_DESCRIPTION'—UI-relevant check description;
5. 'IS_ENABLED'—check if check implementation is ready-to-run;

Those methods can be invoked in the following sequence:
1. 'GET_ENABLED', if ABAP_FALSE, no check step will be presented in the wizard
2. 'GET_CHECK_NAME'
3. 'GET_CHECK_DESCRIPTION'
4. 'PERFORM_CHECK', here the actual checks should be executed
5. 'SET_ACCEPTED' with user accepted/ignored conflicts Buffer certification according to the embodiments of the example, is now described. In order to document the checks executed, the generated buffer file may be complemented by a certificate file reporting the checks, their results, and potential exemptions.

This certificate need not be of cryptographic or security quality, but rather a documentation of the preceding actions taken to generate a given buffer. This is especially helpful since the generation of the buffer file and the actual inclusion into the upgrade are decoupled and might occur with some timely distance.

Figure 14:
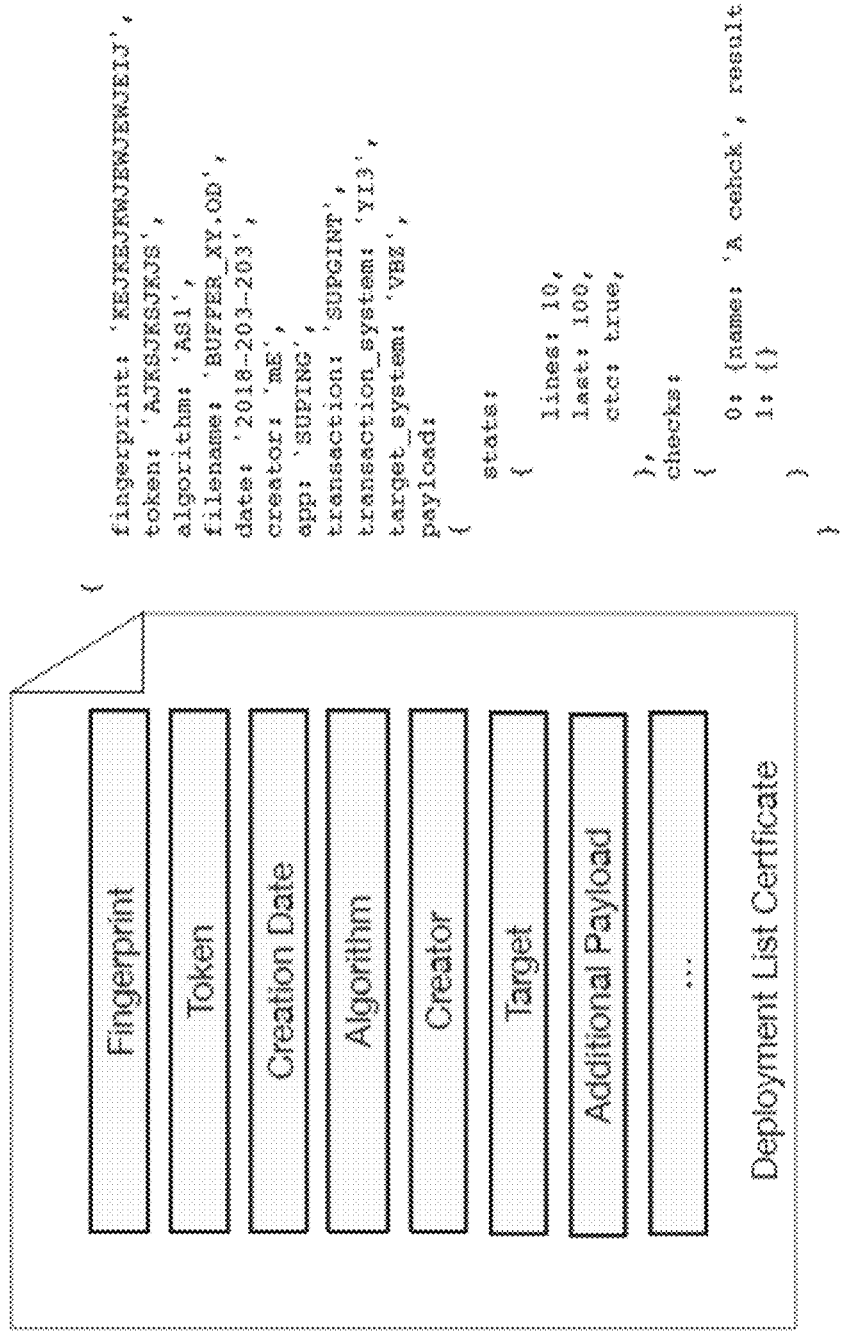
FIG. 14 is a simplified view of a buffer certificate according to the example.

The example buffer certificate shown in FIG. 14 may be an additional, human readable file (e.g. in json format) containing different pieces of meta information about the generated buffer. Such meta information can include a cryptographic fingerprint.

In this example, the data itself may also be captured and stored in the ABAP system for optional verification. The file itself will be generated together with the buffer file in the last step of the selection wizard/process. This is shown in FIG. 13B.

Performance aspects of approaches to upgrade transport compliance checking according to embodiments, are now described. Given that a single check run might involve multiple check runs against the data of different production systems, the overall runtime of the check depends upon the size of the production landscape. That is, n production systems result in n check runs, s n*single_runtime.

In order to enhance performance in that situation, a simple, yet powerful merge concept can be introduced as part of the data retrieval and sync mechanism. Specifically, instead of performing multiple checks against the data from each production system, a simple 'maximum value merge' can generate data for a virtual system based on the data of all relevant production systems (selected during configuration).

Figure 15:
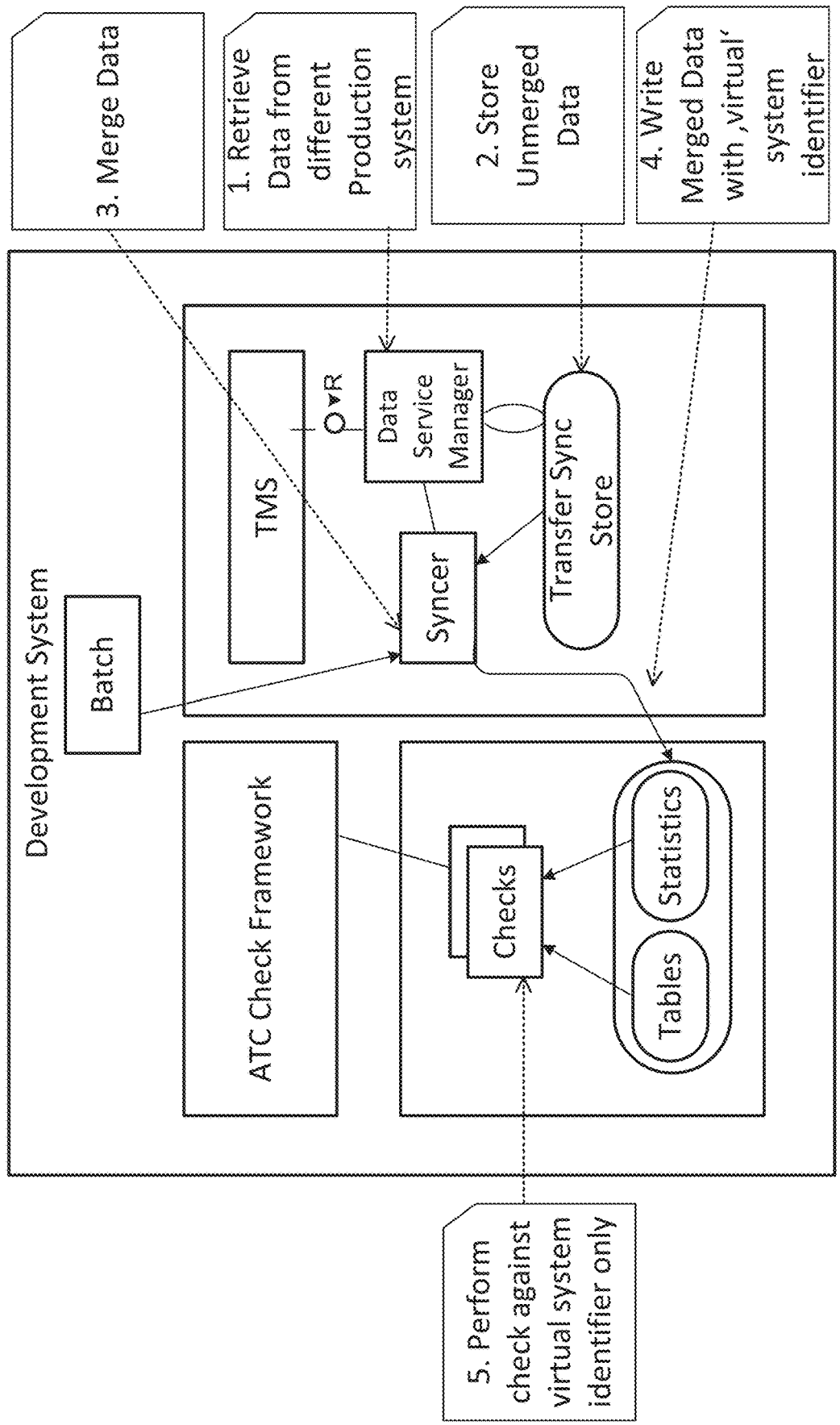
FIG. 15 is a simplified block diagram showing merged data according to the example.

As the checks apply a simple threshold criterium, it is sufficient to store the maximum of all 'changes_per_sec', and the maximum of all 'total_size_in_mb' value for each table comparing all relevant systems. If so configured, the check will then not be executed against all known production systems, but rather against this one merged virtual system proxy. As this merge can be performed during data synchronization, it does not require any change of the check logic shown in FIG. 15.

Upgrade transport compliance checking approaches according to embodiments may offer one or more benefits. In particular, specific embodiments of transport checking can be implemented with known building blocks for performing compliance checking, reusing existing infrastructure (e.g., existing checks, existing data storage, TMS communication infrastructure) to some extent.

Furthermore, embodiments may implement upgrade transport compliance checking in a manner which does not create security vulnerabilities. That is, due to the sensitive nature of the statistical data (e.g.: it is an indicator for the type of productive usage), the infrastructure stores the data in a secured manner.

Embodiments can reuse existing data storage, but with the data packed and reduced from detailed statistical information to two-valued data points. Such data can be stored even in development systems.

The particular embodiment of FIG. 1 is depicted with the engine responsible for performing transport compliance checking, located outside of a database layer. However, this is not required.

Rather, alternative embodiments could leverage the processing power of an in-memory database engine (e.g., the in-memory database engine of the HANA in-memory database available from SAP SE), in order to perform one or more of the following:
performance of upgrade compliance check(s);
condensing landscape production data to bi-value form;
merging production data across multiple landscapes.

Moreover, while FIG. 1 shows the (uncondensed) buffer as being stored outside of the underlying database layer, this is also not required. Instead, certain embodiments could store the buffer in the database layer (which could be an in-memory database including the in-memory database engine).

Figure 16:
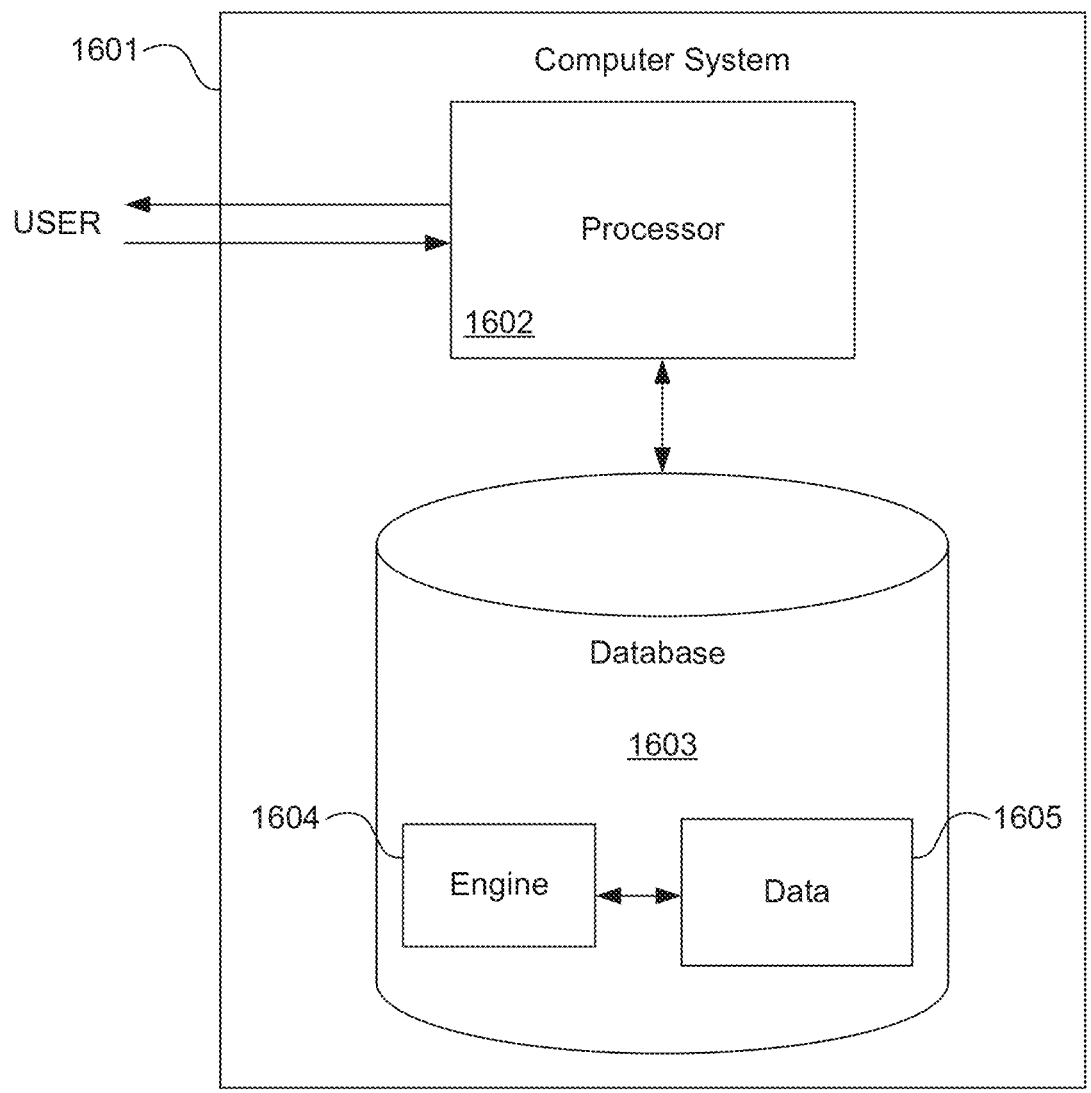
FIG. 16 illustrates hardware of a special purpose computing machine according to an embodiment that is configured to implement software upgrade transport compliance checking.

FIG. 16 illustrates hardware of a special purpose computing machine configured to implement software upgrade transport compliance checking according to an embodiment. In particular, computer system 1601 comprises a processor 1602 that is in electronic communication with a non-transitory computer-readable storage medium comprising a database 1603. This computer-readable storage medium has stored thereon code 1605 corresponding to computer landscape production data. Code 1604 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 17:
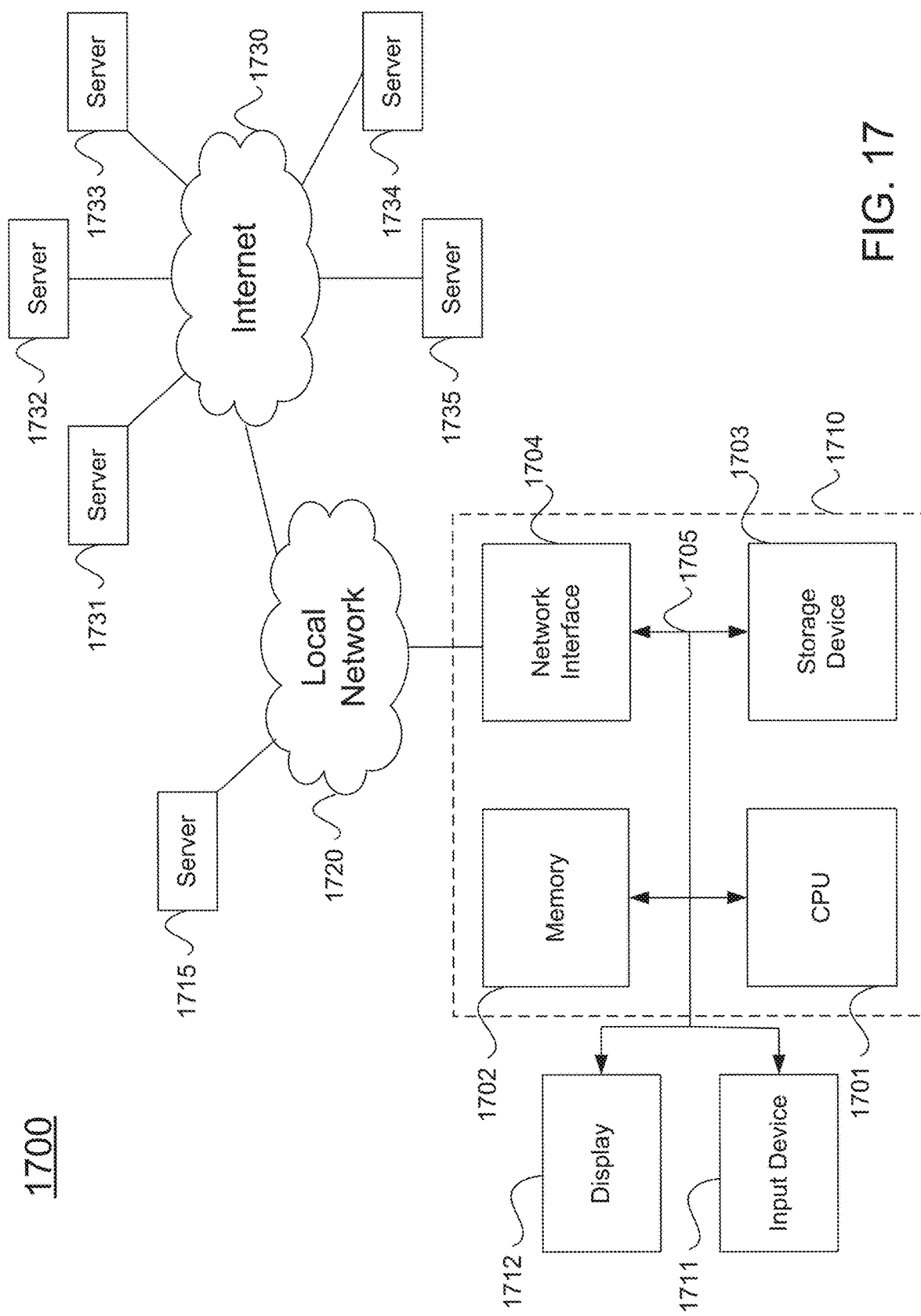
FIG. 17 illustrates an example computer system.

An example computer system 1700 is illustrated in FIG. 17. Computer system 1710 includes a bus 1705 or other communication mechanism for communicating information, and a processor 1701 coupled with bus 1705 for processing information. Computer system 1710 also includes a memory 1702 coupled to bus 1705 for storing information and instructions to be executed by processor 1701, including information and instructions for performing the techniques described above, for example. This memory may also be used for storing variables or other intermediate information during execution of instructions to be executed by processor 1701. Possible implementations of this memory may be, but are not limited to, random access memory (RAM), read only memory (ROM), or both. A storage device 1703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1703 may include source code, binary code, or software files for performing the techniques above, for example. Storage device and memory are both examples of computer readable mediums.

Computer system 1710 may be coupled via bus 1705 to a display 1712, such as a cathode ray tube (CRT) or liquid crystal display (LCD), for displaying information to a computer user. An input device 1711 such as a keyboard and/or mouse is coupled to bus 1705 for communicating information and command selections from the user to processor 1701. The combination of these components allows the user to communicate with the system. In some systems, bus 1705 may be divided into multiple specialized buses.

Computer system 1710 also includes a network interface 1704 coupled with bus 1805. Network interface 1704 may provide two-way data communication between computer system 1710 and the local network 1720. The network interface 1704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1704 sends and receives electrical, electromagnetic, or optical signals that carry digital data streams representing various types of information.

Computer system 1710 can send and receive information, including messages or other interface actions, through the network interface 1704 across a local network 1720, an Intranet, or the Internet 1730. For a local network, computer system 1710 may communicate with a plurality of other computer machines, such as server 1715. Accordingly, computer system 1710 and server computer systems represented by server 1715 may form a cloud computing network, which may be programmed with processes described herein. In the Internet example, software components or services may reside on multiple different computer systems 1710 or servers 1731-1735 across the network. The processes described above may be implemented on one or more servers, for example. A server 1731 may transmit actions or messages from one component, through Internet 1730, local network 1720, and network interface 1704 to a component on computer system 1710. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   receiving data from a production environment of a first software landscape;
   executing a first upgrade compliance check upon the data;
   generating a pre-transport report including a first result of the first upgrade compliance check;
   receiving a released transport comprising the first upgrade compliance check and a second upgrade compliance check;
   executing the released transport upon the data;
   generating a transport report including a second result of the released transport;
   communicating the second result to a developer;
   performing an impact analysis including the released transport, upon a buffer; and
   generating a buffer certificate documenting preceding efforts to generate the buffer, the buffer certificate including a cryptographic fingerprint, wherein:
   the data is stored in an in-memory database; and
   the first upgrade compliance check is executed upon the data by an in-memory database engine of the in-memory database.

2. The method as in claim 1 wherein the data is condensed to bi-value form.

3. The method as in claim 2 wherein the data is stored locally in an application layer.

4. The method as in claim 1 wherein the data is merged across,
   the production environment of the first software landscape, and
   a production environment of a second software landscape.

5. The method as in claim 1 wherein the second upgrade compliance check comprises an illegal object check.

6. The method as in claim 1 wherein the impact analysis including the released transport is performed upon the buffer comprising the data in an uncondensed format, the method further comprising generating an impact analysis report.

7. The method as in claim 1 wherein the buffer is also stored in the in-memory database.

8. The method as in claim 1 wherein the buffer is stored outside of the in-memory database.

9. A non-transitory computer readable storage medium embodying a computer program for performing a method, said method comprising:
   receiving data from a production environment of a first software landscape, the data condensed to a bi-value form;
   executing a first upgrade compliance check upon the data;
   generating a pre-transport report including a first result of the first upgrade compliance check;
   receiving a released transport comprising the first upgrade compliance check and a second upgrade compliance check;
   executing the released transport upon the data;
   generating a transport report including a second result of the released transport;
   communicating the second result to a developer
   performing an impact analysis including the released transport, upon a buffer; and
   generating a buffer certificate documenting preceding efforts to generate the buffer, the buffer certificate including a cryptographic fingerprint, wherein:
   the data is stored in an in-memory database;
   the first upgrade compliance check is executed upon the data by an in-memory database engine of the in-memory database.

10. The non-transitory computer readable storage medium as in claim 9 wherein the data is merged across,
    the production environment of the first software landscape, and
    a production environment of a second software landscape.

11. The non-transitory computer readable storage medium as in claim 9 wherein the second upgrade compliance check comprises an illegal object check.

12. The non-transitory computer readable storage medium as in claim 9 wherein the impact analysis including the released transport is performed upon the buffer comprising the data in an uncondensed format, and the method further comprises generating an impact analysis report.

13. The non-transitory computer readable storage medium as in claim 9 wherein the buffer is also stored in the in-memory database.

14. The non-transitory computer readable storage medium as in claim 9 wherein the wherein the buffer is stored outside of the in-memory database.

15. A computer system comprising:
one or more processors;
a software program, executable on said computer system, the software program configured to cause an in-memory database engine to:
receive data from a production environment of a first software landscape;
execute a first upgrade compliance check upon the data;
generate a pre-transport report including a first result of the first upgrade compliance check;
receive a released transport comprising the first upgrade compliance check and a second upgrade compliance check;
execute the released transport upon the data;
generate a transport report including a second result of the released transport;
communicate the second result to a developer;
perform an impact analysis including the released transport, upon a buffer; and
generate a buffer certificate documenting preceding efforts to generate the buffer, the buffer certificate including a cryptographic fingerprint.

16. The computer system as in claim 15 wherein the in-memory database engine is further configured to provide the data condensed into a bi-value form.

17. The computer system as in claim 15 wherein the in-memory database engine is further configured to provide the data merged across,
the production environment of the first software landscape, and
a production environment of a second software landscape.

18. The computer system as in claim 15 wherein the in-memory database is configured to:
perform the impact analysis including the released transport, upon the buffer comprising the data in an uncondensed format; and
generate an impact analysis report.

19. The computer system as in claim 18 wherein the buffer is also stored in the in-memory database.

20. The computer system as in claim 15 wherein the buffer is stored outside of the in-memory database.

\* \* \* \* \*